Sept. 2, 1930. A. STROE 1,774,907
METHOD OF MANUFACTURING DENTURES
Filed May 8, 1929

Inventor
Ambrose Stroe
By his Attorney

Patented Sept. 2, 1930

1,774,907

UNITED STATES PATENT OFFICE

AMBROSE STROE, OF CLEVELAND, OHIO

METHOD OF MANUFACTURING DENTURES

Application filed May 8, 1929. Serial No. 361,409.

This invention relates to a method of manufacturing dentures, and more particularly to a method of manufacturing vulcanite dentures.

The main object of the invention is to provide a method of manufacturing the palate of all upper or lower teeth or the partial palate so as to produce a thin denture of accurate contour to give a natural feeling in the mouth of the wearer or an accurate denture of a desired greater thickness, which dentures will not be warped in the process of manufacture.

Another object of the invention is to provide a method of manufacturing dentures of said character, which will save both time and material.

With the above and other objects in view, the invention will be hereinafter fully described with reference to the accompanying drawings, and the novel features thereof will be distinctly pointed out in the appended claims.

In the several views of the drawings, similar characters of reference are used to designate corresponding parts.

Figure 1:
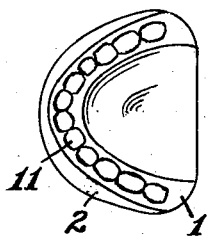
Figure 2:
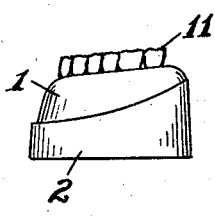
Figure 3:
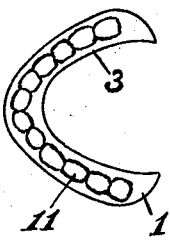
Figure 4:
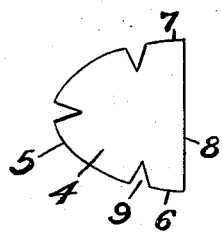
Figure 5:
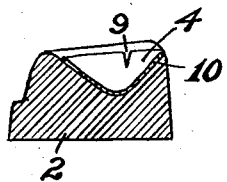
Figure 6:
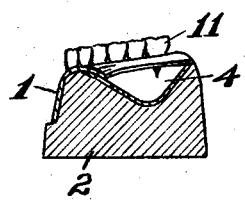
Figure 7:
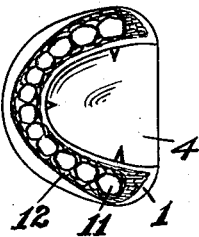
Figure 8:
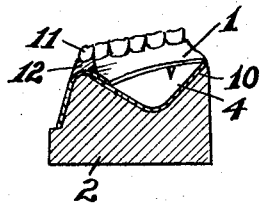
Figure 9:
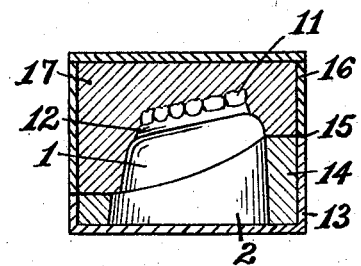

Figure 1 is a plan view of the plaster or stone model with the wax plate carrying the teeth, Fig. 2 is a side view of same, Fig. 3 is a plan view of the wax plate removed from the model and the palate thereof cut out, Fig. 4 is a plan view of the tinfoil with incisions cut in the edges thereof, Fig. 5 is a longitudinal sectional view of the plaster or stone model with the tinfoil burnished therein, Fig. 6 is a similar view to Fig. 5, the wax plate carrying the teeth having been applied thereto, Fig. 7 is a plan view of Fig. 6, the wax having been applied to the inner and outer sides around the teeth, Fig. 8 is a similar view to Fig. 6, after the wax around the teeth has been made smooth, Fig. 9 is a side elevation of Fig. 8 arranged in the vulcanizing flask.

Figure 10:
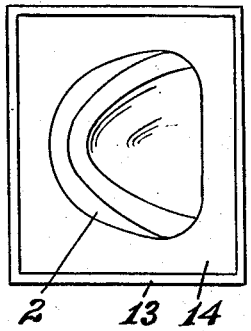
Figure 11:
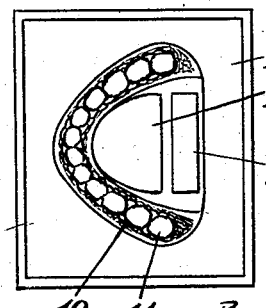
Figure 12:
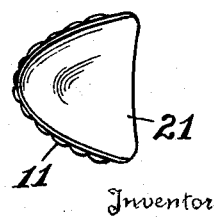

Fig. 10 is a plan view of the lower part of the vulcanizing flask, after the upper part thereof has been removed, Fig. 11 is a bottom plan view of the upper part of the flask, after the wax around the teeth has been removed and vulcanizing rubber packed therearound and placed in the palate, and Fig. 12 is a top plan view of the finished plate.

The denture is made in the ordinary manner to the finishing process, by first taking the wax or plaster impression, pouring the plaster or stone model, then making the wax plate therefrom with teeth in position, and trying in said wax plate.

Said wax plate is now ready for the finishing process in accordance with this invention, which will now be described.

The first step consists in removing the wax plate 1 from the plaster or stone model 2 and cutting out the palate therefrom at 3, then taking a sheet of thin tinfoil, for instance sixty gauge, and folding it upon itself to provide a plurality of thicknesses, indicated at 4, which is first smoothed out upon a flat surface, and then cut to proper size or slightly larger than cut out palate of wax plate 1 and having a forward rounding end 5, curved sides 6 and 7, and a square rear end 8, with opposite wedge or V shaped incisions, indicated by 9, cut in said sides, and in the forward rounding end as shown. Next placing said pile of sheets of tinfoil 4 upon the palatal surface of the model 2 and burnishing same therein, and then applying sticky wax at 10 to the margin of the last sheet of tinfoil for cementing said pile of tinfoil to the plaster or stone model 2. Instead of said tinfoil, twenty-eight gauge casting wax may be used. Next replacing the wax plate 1 upon the model 2 with teeth 11 in position thereon, then applying wax to the inner and outer margins of said wax plate and around said teeth as indicated at 12, and directing a hot gas flame upon said wax for smoothing same. And then dipping said model together with said plate and teeth in water for cooling same, and finally rubbing with wet cloth until smooth.

The next step is investing and consists of placing the plaster or stone model 2 with the wax plate 1 and teeth 10 thereon in the lower part 13 of a vulcanizing flask, which has been filled with the usual amount of smooth plaster indicated at 14. When the plaster 14 has set sufficiently, it is trimmed at 15 even with the flask joint, and the joint surface painted with a solution of silica of soda to permit ready separation of the upper part 16 of the flask from the lower part 13 thereof as is the usual practice. The upper part 16 of the flask is placed in position, and there is poured therein smooth plaster about the consistency of whipped cream as indicated at 17. The flask is vibrated gently during the setting of the plaster 17 to eliminate air bubbles. After the plaster 17 is set sufficiently in the upper part 16 of the flask, the whole flask is heated and the upper part thereof carrying the teeth and wax plate is removed.

Next remove the tinfoil palate 4 from the model 2 and then wash the wax 12 out from around the teeth 11 using hot water with gold dust or similar powder therein, thus leaving said teeth in the plaster 17 of the upper part 16 of the flask. Sprinkle talcum powder over the inner surface of the palatal model 2, and rub said surface with dry cotton-batten for smoothing same, then rewash and dry said inner surface of said palatal model, all the time keeping said palatal model warm. Next place vulcanizing rubber around the teeth in the ordinary manner, as indicated at 18, and then lay two strips of sheet rubber 19 and 20 upon the palatal surface as shown in Fig. 11. Place the upper part 16 of the flask in position upon the lower part 13 and place the flask in a press, then immerse the press holding the flask in hot water and leave therein until the vulcanizing rubber 18, 19 and 20 is soft, then apply pressure to said flask and bolt the upper and lower parts thereof together while under pressure. Place the flask in a vulcanizer at 310 degrees Fahrenheit for fifty minutes, increase the heat to 320 degrees and after forty minutes remove the flask from the vulcanizer and cool same in water. Remove the vulcanized plate from the flask, and clean said plate well by means of a brush and cold water.

For dressing the vulcanized plate 21, first trim the edges and front thereof as usual, then use number ten burr for the entire palate, burring lightly so as not to change or erase the palatal contour of said plate, and said plate will not become heated as by the use of sandpaper as is the usual practice and as a result thereof warped. Polish said plate by brushing same lightly using pumistone and water, and then buffing the plate in the usual manner.

From the drawings and description, it will be seen that by this method, vulcanite dentures of slightly varying thicknesses as desired and of accurate contour may be produced at a saving of cost of material and in less time than the present practice.

It will be understood that slight changes in the details of the method of manufacturing dentures may be made within the scope of the claims.

Having fully described my invention, what I claim is:

1. A method of producing dentures consisting of taking impression, making model and wax plate therefrom, setting teeth upon said wax plate, removing said wax plate and cutting out the palate therefrom, placing sheet tinfoil upon the palate of said model, replacing said plate upon said model, applying wax around said teeth, placing said model with wax plate and teeth in a flask, pouring plaster in said flask, washing out said wax and wax plate and removing said tinfoil and substituting therefor rubber, and vulcanizing said rubber.

2. A method of producing dentures consisting of taking impression, making model and wax plate therefrom, setting teeth upon said wax plate, removing said wax plate and cutting out the palate therefrom, placing sheet tinfoil upon the palate of said model, replacing said plate upon said model, applying wax around said teeth, placing said model with wax plate and teeth in a flask, pouring plaster in said flask, washing out said wax and wax plate and substituting therefor rubber, removing said tinfoil and substituting therefor a plurality of pieces of sheet rubber, and vulcanizing said rubber.

3. A method of producing dentures consisting of taking impression, making model and wax plate therefrom, setting teeth upon said wax plate, removing said wax plate and cutting out the palate therefrom, placing sheet tinfoil upon the palate of said model, replacing said plate upon said model, applying wax around said teeth, placing said model with wax plate and teeth in a flask, pouring plaster in said flask, washing out said wax and wax plate and substituting therefor rubber, removing said tinfoil and substituting therefor a plurality of pieces of sheet rubber and heating said flask in a vulcanizer to 310 degrees for fifty minutes and then increasing the heat to 320 degrees for forty minutes.

4. A method of producing dentures consisting of taking impression, making model and wax plate therefrom, setting teeth upon said wax plate, removing said wax plate and cutting out the palate therefrom, placing sheet tinfoil upon the palate of said model, replacing said plate upon said model, applying wax around said teeth, placing said model with wax plate and teeth in a flask, pouring plaster in said flask, washing out said wax and wax plate and substituting therefor rubber, removing said tinfoil and substituting therefor a plurality of pieces of sheet rubber, heating said flask in a vulcanizer to 310 degrees for fifty minutes and then increasing the heat to 320 degrees for forty minutes, removing the vulcanized plate, trimming and burring said plate lightly, and finally polishing said plate with pumice and water.

5. A method of producing dentures consisting of taking impression making model and wax plate therefrom, setting teeth upon said wax plate, removing said wax plate and cutting out the palate therefrom, placing sheet tinfoil upon the palate of said model, burnishing the sheet tinfoil within the palate of said model, cementing the edges of said tinfoil to said model, replacing said wax plate upon said model applying wax around said teeth, placing said model with wax plate and teeth in a flask, filling said flask with plaster, washing out said wax and wax plate and substituting therefor rubber, removing said tinfoil from the model and substituting therefor two pieces of sheet rubber, and vulcanizing said rubber.

6. A method of producing dentures consisting of taking impression, making model and wax plate therefrom, setting teeth upon said wax plate, removing said wax plate and cutting out the palate therefrom, placing a plurality of sheets of tinfoil within the palatal cavity of said model, applying sticky wax to the edges of said sheets of tinfoil for cementing same to said model, replacing said wax plate upon said model, applying wax around said teeth, placing said model with wax plate and teeth in a flask, filling said flask with plaster, washing out said wax and wax plate and substituting therefor rubber, removing said tinfoil and substituting therefor two sheets of sheet rubber, heating the flask in a vulcanizer to vulcanize said rubber, removing the vulcanized plate, trimming and burring the plate lightly, and finally polishing said plate.

In testimony whereof I affix my signature.

AMBROSE STROE.